United States Patent [19]

Beach et al.

[11] 3,722,373

[45] Mar. 27, 1973

[54] DIFFERENTIAL PRESSURE RESPONSIVE DEVICE OF WELDED CONSTRUCTION

[75] Inventors: Richard G. Beach, Greece; Harry Stultz, Jr., Chili; Symonds, James A., Penfield, all of N.Y.

[73] Assignee: Sybron Corporation, Rochester, N.Y.

[22] Filed: June 23, 1969

[21] Appl. No.: 835,566

[52] U.S. Cl..................92/97, 73/407 R, 92/104
[51] Int. Cl..................F01b 19/00, G011 7/08
[58] Field of Search.......73/393, 407 R; 92/1, 38, 97, 92/102, 48, 50

[56] References Cited

UNITED STATES PATENTS

| | | | |
|---|---|---|---|
| 2,627,750 | 2/1953 | Titus | 73/407 |
| 2,645,248 | 7/1953 | Baker | 92/97 |
| 2,659,390 | 11/1953 | MacLea et al | 73/393 X |
| 2,770,258 | 11/1956 | Bowditch | 73/407 X |
| 2,879,802 | 3/1959 | DuBois | 92/97 X |
| 2,989,084 | 6/1961 | Jones | 73/407 |

FOREIGN PATENTS OR APPLICATIONS 600,636   6/1957   Canada ........................92/1

*Primary Examiner*—Louis R. Prince
*Assistant Examiner*—Daniel M. Yasich
*Attorney*—Peter Young, Jr. and Joseph C. MacKenzie

[57] ABSTRACT

A differential pressure responsive device including a body of metal and a pair of metal diaphragms welded around their peripheries to opposite sides of the body. A first bore in the body interconnects the adjacent sides of the diaphragms and receives a connector mechanically interconnecting the diaphragms. A second bore through the body is closed at one end by a third metal diaphragm welded around its periphery to the body. The other end of the bore is closed by a plug assembly. The second bore passes through the first bore and has a rigid bar therein connected at one end to said connector and passes out thereof through said third diaphragm, which is welded to the bar. The space in said body between said pair of diaphragms, and in said bores, is solidly filled with liquid in sufficient volume to maintain tension on the connector over the range of temperatures which may be encountered in use of the device. Flanges clamped to the peripheries of the pair of diaphragms provide for applying pressures to same. Between the flanges and the diaphragm peripheries is sandwiched a welding ring, welded along with the diaphragms to the body.

3 Claims, 2 Drawing Figures

INVENTORS
RICHARD G. BEACH
JAMES A. SYMONDS
HARRY STULTZ, JR.

DIFFERENTIAL PRESSURE RESPONSIVE DEVICE OF WELDED CONSTRUCTION

CROSS REFERENCES TO RELATED APPLICATIONS

Symonds et al, filed June 23, 1969, Ser. No. 835,400, entitled DIFFERENTIAL PRESSURE RESPONSIVE DEVICE WITH DIAPHRAGM EQUALIZATION, assigned to the assignee of the present invention and now U.S. Pat. No. 3,563,138 issued Feb. 16, 1971.

BACKGROUND OF THE INVENTION

1. Field of the Invention

The background of the invention is measurement of difference between two pressures by means of two diaphragms, or the like, exposed on one side to the respective pressures. A mechanical connector and a liquid volume interconnect the diaphragms and mechanism is connected to said connector for producing a movement reflecting the magnitude of said difference.

2. Description of the Prior Art

In the prior art, the aforesaid mechanism is exposed to the fluid having one of two pressures, or if the mechanism is located in the liquid, various gasket arrangements are provided to seal off the liquid volume from pressures external to the diaphragms. In general, prior art arrangements do not provide for positively preventing said fluid, if corrosive, from attacking said mechanism, or such structure as is used to support the diaphragms and contain the volume of liquid.

SUMMARY OF THE INVENTION

In the present invention, the mechanism is located in the liquid and welded seals seal off the liquid from pressures external to the diaphragms. The diaphragm welds are located so as to positively isolate the more vulnerable portions of the diaphragm and mechanism supporting structure from the fluid or fluids in which arise the pressure or pressures external to the diaphragms.

For example, a pressure responsive device according to the invention has a body of metal and a pair of diaphragms welded around their peripheries to opposite sides of the body. A first bore in the body interconnects the adjacent sides of the diaphragms and receives a connector mechanically interconnecting the diaphragms. A second bore through the body is closed at one end by a third metal diaphragm welded around its periphery to the body. The other end of the bore is closed by a plug assembly. The second bore passes through the first bore and has a rigid bar therein connected at one end to said connector and passes out thereof through said third diaphragm, which is welded to the bar. The space in said body between said pair of diaphragms, and in said bores, is solidly filled with liquid in sufficient volume to maintain tension on the connector over the range of temperatures which may be encountered in use of the device. Flanges clamped to the peripheries of the pair of diaphragms provide for applying pressures to same. Between the flanges and the diaphragm peripheries is sandwiched a welding ring, welded along with the diaphragms to the body.

DESCRIPTION OF THE PREFERRED EMBODIMENT OF THE INVENTION

Figure 1:
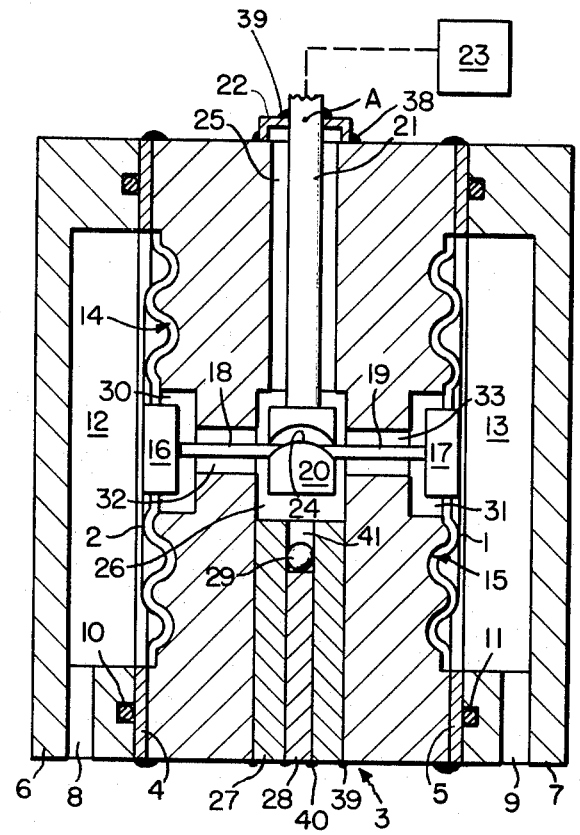
FIG. 1 is a cross-section through a differential pressure responsive device according to the invention.

FIG. 1 shows what, for the most part, is a conventional sort of differential pressure responsive device. In fact, save for a more prolific use of reference numerals, and the showing of various welds, FIG. 1 hereof is identical to FIG. 1 of the aforementioned application of Symonds et al.

The operation and properties of the device are well-known and evident from the drawing. However, by way of review, fluid pressure from one source (not shown) is admitted to space 12 via port 8, and fluid pressure from another source is admitted to space 13 via port 9. If the difference between the two pressures is not zero, diaphragms 1 and 2 move as a unit by virtue of the liquid between them. The basic structure is such that the diaphragms 1 and 2, body 3, and the liquid therein, define a unitary incompressible element, which is essentially rigid, except for the diaphragm motion (and, of course, the output deflection of bar 21).

The illustrated structure is designed with an eye to keeping the fluid in spaces 12 and 13 isolated from body 3 and from the mechanism and liquid therein, and as well, to prevent damage to the diaphragms at excessive pressure levels.

Figure 2:
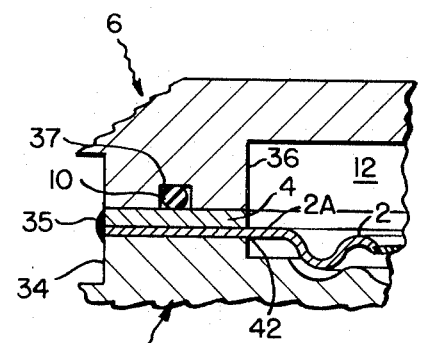
FIG. 2 is similar to FIG. 1 except that it is restricted to a fragment of FIG. 1, and such fragment is enlarged in order to better illustrate certain structural detail.

According to the invention, the former goal is achieved by the manner of securing diaphragms 1 and 2 to body 3, as shown best in FIG. 2. Thus, a circular flat ledge 34 on body 3 has the flat rim portions 2A of diaphragm 2 seated flush thereon, on which portion the flat surfaces circular welding ring 4 seats flush. In their natural state, i.e., finished but unmounted, the peripheries of the diaphragms are flat, so that they can rest flat on the ledge surfaces. While they are so resting, a continuous weld 35 is made around the peripheral edges of a ring 4, ledge 34, and portion 2A, fusing these edges together hermetically. Diaphragm 1 is similarly secured to body 3. The ring 4 is flat and so lies flat on the diaphragm periphery. It is, of course, convenient to clamp the rings and diaphragms lightly in position, for welding purposes, since the diaphragm forming process is likely to leave the diaphragms a bit curved. However, the amount of force needed to sandwich the ring and diaphragm with the ledge is modest. Also, the diaphragm curvature is not so much as to generate any significant local stresses when flattened out.

Flange 6 has a flat circular ledge 36 theron seating flush on the welding ring. However, flange 6 is simply bolted to body 3, and the gasket 10, in a circular groove 37 of ledge 36 provides an elastomeric seal for space 12 defined by flange 6. Flange 7 is similarly secured to body 3. Since the diaphragms are substantially naturally flat to the flats of rings and ledges, very large flange clamping forces can be used, and, of course, must be chosen to suit the pressure levels to be encountered in spaces 12 and 13.

As long as diaphragm 1 or 2 does not itself leak, the fluid in spaces 12 and 13 is effectively isolated from body 3. Further, even if such fluid leaks past the elastomeric seal between flange 6 or 7 and body 3, the welds securing rings 4 and 5 and diaphragms 1 and 2 to the body 3, confine the fluid to the external surface of body 3. In practice, the most likely occasion for causing diaphragm leakage would be in assembly and disassembly of the device shown in FIG. 1. Thus, if welding ring 4 were omitted and a hard particle happened to get clamped between the mating surfaces of ledge 36 and portion 2A, clamping force might well cause the particle to perforate the diaphragm, somewhere between weld 35 and the inner edge of the ledge 36. Leakage could readily occur, therefore, especially if the particle were located between groove 37 and the inner edge of ledge 36. However, though the diaphragm can be as little as 0.004 inch thick, ring 4 will be so thick, 0.025 inch, for example, that such hard particle would simply embed itself between ring 4 and ledge 36, and have no effect, not even on the seal due to gasket 10, in all probability.

The sealing of body 3 by welding is carried through to the seal at 22 and the filler plug assembly consisting essentially of elements 27, 28 and 29. As shown, seal 22 is a cup-shaped metal diaphragm welded around its periphery, as indicated at 38, around the upper opening of a bore 25 in body 3. Bar 21 passes through diaphragm 22, and is welded around its periphery, as indicated at 39, to the diaphragm 22. A bore 26, a slightly larger bore than bore 25, but essentially a continuation thereof through body 3 is closed by plugs 27 and 28. As indicated at 39, the lower end of plug 27 is welded at its outer periphery to the periphery of the lower end of bore 26. Plug 27 is a sleeve, which in turn is partly filled by plug 28, with welding at 40 to seal the lower peripheries of the two plugs together.

Consequently, the liquid and mechanism in body 3 are isolated from the external environment by a continuous cover of metal. Only motion, so to speak, can enter or leave the interior of body 3, i.e., the diaphragms move one way or the other to deflect bar 21, which then flexes seal diaphragm 22 and provides a deflection sensed by detector 23. Suitable means (not shown but known in the prior art) will normally be provided to restrain bar 21 and/or diaphragm 22 from deflecting along the bar length, while allowing the bar to pivot at about the diaphragm 22 hermetically sealing to it and hermetically sealing it to the body 3. In use, the static pressure within the body 3 will differ substantially from that external to diaphragm 22, hence there will be a net force attempting to push the bar 21 out of the body. Usually, but not necessarily always, it is desirable to prevent this effect, if appreciable. However, it does not make any difference to the principles of the present invention, so no particular means for dealing with the effect is shown.

The all-welded construction is of great advantage as the user can do very little to the device beyond changing flanges. As a practical matter what is inside the body 3 is simply not accessible to him (the diaphragm pads are either inside the body 3 or, if they project through the center part of the diaphragm, are welded thereto to make pad and diaphragm one continuous metallic member). Therefore, improper maintenance, adjustment, repair, etc., which are common sources of problems, are reduced to an absolute minimum.

Bores 25 and 26, bores 32 and 31 accommodating stems 18 and 19, bores 30 and 33 accommodating pads 16 and 17 and the space between diaphragm corrugations and body 3 corrugations, are shown somewhat exaggerated. In practice, these are dimensioned so as to leave just enough space to accommodate the movements of the parts inside the body.

However, the bore 26, in addition, provides for filling the device with liquid, and is dimensioned so as to permit adjusting of connector 20, as one of the final assembly stages in manufacturing the device of FIG. 1. At this stage, the device is as shown in FIG. 1, except that there is no liquid in the body 3 and the filler assembly 27, 28 and 29 is absent. Adjustment of the connector is carried out as indicated in the previously referred to application of Symonds et al. When this is complete, out-gassed liquid is filled into the body 3 via bore 26, the device being finally oriented with what is now the lower end of bore 26 being at the top and the plug 27 in place in bore 26, but not plug 28 and not ball 29. At this point, the fill should be solid, i.e., no bubbles in the various bores and other spaces within body 3 and between it and diaphragms 1 and 2, and all the way up the bore 41 of plug 27. The ball 29 is placed on top of bore 41, and driven thereinto by a suitable tool. The ball is oversized with respect to the bore, so as to seal the latter slightly. In driving the ball thus, somewhat of a bore's length (i.e., of bore 41) of liquid is forced into the space between diaphragms 1 and 2 and block 3, via bores 26, 30, 31, 32 and 33, thereby forcing diaphragms 1 and 2 to bulge away from the corrugated surfaces of body 3 in order to accommodate the volume of fluid forced in. This is desired because the temperature of the device when it is being filled is normally somewhat higher than the device will encounter with use. Since lowering the temperature of the device will cause the liquid volume to contract more than the bore volume and mechanism volume within the body, the diaphragm bulge takes up the decrease in the liquid volume. Two purposes of the liquid fill are to make the diaphragms move as one, and to share the pressure. Except for the bulge, however, contraction of liquid volume might result in a void or gas space developing in the liquid, and this would cause one of the diaphragms to absorb the greater part of the stress due to the pressures in spaces 12 and 13.

When emplacing the ball 29, it is not necessary to try to avoid trapping air between plug 28 and ball 29. Outgassed liquid is used as a fill in the first place simply because the gas content of an un-out-gassed liquid is not usually known, and so too much gas could be introduced by plug 28 if the latter liquid were used as a fill. In the present case, such amount of air as might be introduced by plug 28 is not enough to allow a bubble of significant size to develop, and would usually be dissolved in the liquid, generally a silicone having a relatively large capacity for dissolving air.

Plug 28 is then pushed into place into contact with the top of the ball, and the weld at 39 is then performed to secure it in place. The plug assures that the ball will stay in place, and assures a seal under pressure conditions that might force liquid around the ball or even force the ball to move along bore 41.

The disclosed construction makes the differential pressure device unusually reliable and stable. Note, for example, that the effective areas of the diaphragms are fixed once and for all when the diaphragms they are welded in place. The inner edge 42 of ledge 34 is deliberately made quite sharp, so that once the weld 35 is complete, the edge 42 ever after fixes the effective area of diaphragm 2, since the position of diaphragm 2 cannot change with respect to the ledge. Of course, a like sharp edge is provided for diaphragm 1, in order to fix its effective area. Consequently, once the connector 20 is adjusted such as to balance the difference between the diaphragms' effective areas, and the bore 26 is welded shut, short of destruction, the diaphragms will remain functionally identical.

A further advantage of this construction is the leeway provided in choice of materials. These vary widely in price, corrosion resistance, elastic properties, thermal coefficient of expansion, and so forth. However, desirable combinations do not necessarily weld together well.

For example, type 316 stainless steel is a common choice of material, favorable from various points, for both construction of body 3 and diaphragms 1 and 2. However, if a superior order of corrosion resistance in certain types of service is desired, so-called Hastelloy C is preferable. If the diaphragms are to be made of Hastelloy C, 316 stainless steel would still be desirable as body 3, but differs too much from Hastelloy C in thermal expansion properties. Thus, if the diaphragms 1 and 2, and body 3 expand uniformly, the forces thus generated tend to cancel out. On the other hand, if the diaphragms expand at a different rate than body 3, a net non-zero force, due to the difference in expansion, will act on bar 21.

On the other hand, 430 stainless steel would do quite well for body 3 with Hastelloy C diaphragms, since its thermal expansion properties are substantially the same as those of Hastelloy, except that its corrosion resistance leaves much to be desired in such service as calls for corrosion resistance such as is possessed by Hastelloy C. However, due to the weld at 35 (and its counterpart around diaphragm 1), 430 stainless steel can be used, since the corrosive fluid cannot more than leak past gasket 10 or 11 to the external surface of body 3. It is to be observed, too, that insofar as cost is concerned, it is desirable to keep use of material such as Hastelloy C and 316 stainless steel to the minimum. Using 430 stainless steel is much less costly, so it is desirable to use it instead of the more expensive materials, if possible. Looking at FIG. 1, and recalling that repair of the device shown is a matter of removing the flanges and outright replacing what remains, it is evident that only a small part of what is replaced, namely, diaphragms 1 and 2 (and the welding rings 4 and 5, if used) represent a scrapping of relatively costly material.

Those skilled in the art will be aware of various modifications and refinements which may be indulged in, in connection with our invention as described herein. For instance, making the weld at the rings 4 and 5, e.g., weld 35 would be facilitated by providing the outer periphery of ledge 34 with a slight overhang in initially machining body 3. It is also to be observed that the dimensioning used in the Figures is chosen for clarity and convenience in illustration. For example, the flat portion 2A would ordinarily terminate right at sharp edge 42, i.e., its outermost corrugation would begin just about at edge 42.

Having described our invention in accordance with the requirements of the statutes, we claim:

1. A sealed differential pressure responsive device consisting essentially of a rigid metal body having first and second opposite faces and first and second metal diaphragms;

said first diaphragm having a surface approximately flush with said first face and said second diaphragm having a surface approximately flush with said second face;

said body having a first bore therein interconnecting said diaphragm surfaces and said first bore having therein a connector mechanically interconnecting said diaphragm surfaces;

said body having a second bore therein intersecting said first bore and opening at one side of said body; such opening having a seal hermetically closing same, and there being a rigid bar extending through said seal, along said second bore to said connector, and mechanically connected to said connector, said bar having one end outside said body and one end inside said body and in said second bore;

each said diaphragm being welded continuously around its periphery to said body; said seal including a third metal diaphragm welded to said bar continuously around the circumference of said bar, and said third diaphragm being welded to said body continuously around said opening, there being a volume of liquid solidly filling the interior of said body;

said second bore extending through said body to provide a further opening opposite to the first said opening, said further opening having a metal plug means substantially filling said further opening and being welded continuously around its circumference to said body;

the volume of said plug means and the volume of said liquid being calculated so that at the temperature at which said body was filled, said liquid over-fills the interior of said body such as to bulge said first and second diaphragms away from said surfaces.

2. A sealed differential pressure responsive device consisting essentially of a rigid metal body having first and second opposite faces and first and second metal diaphragms;

said first diaphragm having a surface approximately flush with said first face and said second diaphragm having a surface approximately flush with said second face;

said body having a first bore therein interconnecting said diaphragm surfaces and said first bore having therein a connector mechanically interconnecting said diaphragm surfaces;

said body having a second bore therein intersecting said first bore and opening at one side of said body; such opening having a seal hermetically closing same, and there being a rigid bar extending through said seal, along said second bore to said connector, and mechanically connected to said connector, said bar having one end outside said body and one end inside said body and in said second bore;

each said diaphragm being welded continuously around its periphery to said body; said seal including a third metal diaphragm welded to said bar continuously around the circumference of said bar, and said third diaphragm being welded to said body continuously around said opening, and there being a volume of liquid solidly filling the interior of said body;

the volume of said liquid being so calculated that at a predetermined temperature said liquid over-fills the interior of said body such as to bulge said first and second diaphragms away from said faces; said predetermined temperature being substantially the lowest to which said device will be exposed in use thereof.

3. A sealed differential pressure responsive device consisting essentially of a rigid metal body having first and second opposite faces and first and second metal diaphragms;

said first diaphragm having a surface approximately flush with said first face and said second diaphragm having a surface approximately flush with said second face;

said body having a first bore therein interconnecting said diaphragm surfaces and said first bore having therein a connector mechanically interconnecting said diaphragm surfaces;

said body having a second bore therein intersecting said first bore and opening at one side of said body; such opening having a seal hermetically closing same, and there being a rigid bar extending through said seal, along said second bore to said connector, and mechanically connected to said connector, said bar having one end outside said body and one end inside said body and in said second bore;

each said diaphragm being welded continuously around its periphery to said body; said seal including a third metal diaphragm welded to said bar continuously around the circumference of said bar, and said third diaphragm being welded to said body continuously around said opening, and there being a volume of liquid solidly filling the interior of said body;

said one face having a metal ledge surrounding it, said ledge being flat and the periphery of said first diaphragm resting on the flat of said ledge and being naturally flat; said periphery being welded continuously around the outer bound of said ledge to said ledge, and the inner bound of said ledge being continuously sharp all the way around and at said diaphragm such as to sharply define the effective area of said diaphragm;

there being a flange sealingly seating on said periphery and all the way around, means clamping said flange to said body, and a flat metal welding ring between said flange and said periphery, said welding ring seating flat on said periphery and being welded all the way around its outer bound to said diaphragm, and the weld of said periphery to said ledge, and of said ring to said periphery, being one and the same.

* * * * *